US010878066B2

(12) United States Patent
Qiu

(10) Patent No.: US 10,878,066 B2
(45) Date of Patent: Dec. 29, 2020

(54) SYSTEM AND METHOD FOR CONTROLLED ACCESS TO APPLICATION PROGRAMMING INTERFACES

(71) Applicant: BANMA ZHIXING NETWORK (HONGKONG) CO., LIMITED, Kowloon (HK)

(72) Inventor: Shaoxiang Qiu, Hangzhou (CN)

(73) Assignee: BANMA ZHIXING NETWORK (HONGKONG) CO., LIMITED, Hong Kong (HK)

(*) Notice: Subject to any disclaimer, the term of this patent is extended or adjusted under 35 U.S.C. 154(b) by 54 days.

(21) Appl. No.: 16/037,809

(22) Filed: Jul. 17, 2018

(65) Prior Publication Data
US 2019/0138698 A1 May 9, 2019

Related U.S. Application Data

(63) Continuation-in-part of application No. PCT/CN2017/070981, filed on Jan. 12, 2017.

(30) Foreign Application Priority Data

Jan. 21, 2016 (CN) .......................... 2016 1 0039246

(51) Int. Cl.
G06F 21/12 (2013.01)
G06F 21/62 (2013.01)

(52) U.S. Cl.
CPC .......... *G06F 21/121* (2013.01); *G06F 21/629* (2013.01); *G06F 2221/2141* (2013.01)

(58) Field of Classification Search
None
See application file for complete search history.

(56) References Cited

U.S. PATENT DOCUMENTS

| 6,279,043 B1 | 8/2001 | Hayward | |
|---|---|---|---|
| 8,606,656 B1 | 12/2013 | Franklin | |
| 2008/0092057 A1* | 4/2008 | Monson | G06F 9/451 715/744 |
| 2011/0013003 A1* | 1/2011 | Thompson | G06K 9/00228 348/77 |
| 2014/0259130 A1 | 9/2014 | Li | |
| 2019/0369978 A1* | 12/2019 | Gandhi | G06F 8/65 |

FOREIGN PATENT DOCUMENTS

| CN | 101571900 | 11/2009 |
|---|---|---|
| CN | 101686129 | 3/2010 |
| CN | 101866404 | 10/2010 |
| CN | 101908109 | 12/2010 |

(Continued)

*Primary Examiner* — Simon P Kanaan
(74) *Attorney, Agent, or Firm* — Van Pelt, Yi & James LLP

(57) ABSTRACT

A method for accessing a restricted application programming interface (API) is disclosed, including: receiving, from a first application, a request to access the restricted API, the restricted API not supported by the first application; determining whether the first application is authorized by a provider of the restricted API to access the restricted API; and granting, in response to the determination that the first application is authorized by the provider of the restricted API to access the restricted API, the first application access to the restricted API.

20 Claims, 7 Drawing Sheets

(56) References Cited

FOREIGN PATENT DOCUMENTS

| CN | 102663320 | 9/2012 |
|----|-----------|--------|
| CN | 102915416 | 2/2013 |
| CN | 102916965 | 2/2013 |
| CN | 103001936 | 3/2013 |
| CN | 103095731 | 5/2013 |
| CN | 103701761 | 4/2014 |

\* cited by examiner

200

201 — Retrieve the public key certificates from the list of authorization signatures associated with the first application, and store the retrieved public key certificates to a collection of signatures

202 — Analyze the configuration file of the first application to retrieve the private permissions associated with the access of the restricted APIs of another application or a system

203 — for each private permission configured, execute the steps of: retrieving a public key certificate corresponding to the restricted API from a pre-configured declaration of the private permission, determining whether the retrieved public key certificate matches a copy of the public key certificate recorded in the collection of signatures, if so, determining that the first application has been authorized with private permission required for its execution

```
┌─────────────────────────────────────┐
│ an authorization request is transmitted by a │
│ requesting application to the provider of a  │── 301
│ restricted API such that to request access to the │
│           restricted API            │
└─────────────────────────────────────┘
                    │
                    ▼
┌─────────────────────────────────────┐
│ the credentials of authorization returned by the │── 302
│   provider of the restricted API are received    │
└─────────────────────────────────────┘
                    │
                    ▼
┌─────────────────────────────────────┐
│ the received credentials of authorization are │── 303
│      recorded as part of the application       │
└─────────────────────────────────────┘
```

```
┌─────────────────────────────────────────┐
│ an application to be authorized with    │ ⌐ 401
│ permissions to access the restricted    │
│ APIs is determined                      │
└─────────────────────────────────────────┘
                    │
                    ▼
┌─────────────────────────────────────────┐
│ a credential of authorization is        │
│ generated to indicate that the provider │
│ of the restricted APIs allows the       │ ⌐ 402
│ requested access to the restricted APIs │
│ by the determined application           │
└─────────────────────────────────────────┘
```

```
501: the identification information associated with the authorizing parties is retrieved from the credential of authorization associated with an application, and the retrieved identification information is stored in a collection of authorizing parties 502: a configuration file associated with the application is parsed and analyzed to retrieve private permissions associated with the requests for access to the restricted APIs 503: for each of the retrieved private permissions, execute the steps of: retrieving the identification information associated with the private permission from a pre-configured declaration of private permissions, determining whether a copy of the identification information from the collection of authorizing parties matches the retrieved identification information, if so, determining that the application has obtained the private permission
```

FIG. 5

SYSTEM AND METHOD FOR CONTROLLED ACCESS TO APPLICATION PROGRAMMING INTERFACES

CROSS REFERENCE TO OTHER APPLICATIONS

This application is a continuation-in-part of and claims priority to International (PCT) Application No. PCT/CN17/70981 entitled METHOD AND DEVICE FOR APPLICATION PROGRAM TO ACCESS INTERFACE, AND METHOD AND DEVICE FOR APPLICATION PROGRAM TO REQUEST AUTHORIZATION filed Jan. 12, 2017 which is incorporated herein by reference for all purposes, which claims priority to People's Republic of China Patent Application No. 201610039246.9 entitled AN APPLICATION INTERFACE ACCESS METHOD, AUTHORIZATION REQUEST METHOD, AND DEVICE filed Jan. 21, 2016 which is incorporated herein by reference for all purposes.

FIELD OF THE INVENTION

The present invention relates generally to access to application programming interfaces and more particularly, to controlled access to restricted application programming interfaces.

BACKGROUND OF THE INVENTION

With the increasing popularity and ubiquity of mobile devices, developers are constantly creating applications to expand the variety of services available to users on mobile devices. As a result, in addition to system platform providers furnishing application programming interfaces (APIs) to application developers to allow access to various computing resources and data, application developers are also providing APIs of one application to another to allow intra-application interactions. Such APIs support access to various hardware resources, user data, components, and the like. In order to promote intra-application interactions without compromising the security measurements, a system platform (e.g., the operating system) oftentimes resorts to managing access to APIs through permission-based mechanisms.

Taking the Android™ operating system for example, the Android™ system itself is configured with a set of permissions that control the access to certain APIs. At the same time, it also allows an application developer to declare, in an AndroidManifest.xml file associated with the application, one or more "permission" elements for controlling the access to the application's protected APIs. On the other hand, for an application that needs access to the aforementioned protected or restricted APIs supported by another application or a system platform, the developer of the application can specify such required access using one or more "user-permission" elements, also in an AndroidManifest.xml file associated with the application.

When an application accesses a restricted API of a system platform or another application, the decision of whether to grant the application the access to the restricted API is typically determined based on a confirmation from the user of the application. For example, during the installation of an application (App) downloaded from an app store (e.g., Google Play Store, etc.) by a user on a mobile device, the user is generally prompted with a list of permissions that the App requires in order to execute properly on the mobile device. The user can either accept all the required permissions to the App and complete the installation of the App, or deny all the required permission to the App and cancel the installation of the App downloaded. At runtime, the system or the application only allows access to the protected APIs when it is verified that such access permission is consented by the user.

Therefore, the access to restricted APIs from an application is typically controlled by the user of an application, instead of by the parties that provide such restricted APIs (e.g., the developer of the application supplying the restricted APIs, the operating system provider, such as Apple, Microsoft, that releases the system, etc.). As such, the intended usage by the provider in supplying the restricted APIs is often not manifested or ascertained to any extent, and the developers sometimes carelessly specify excessive or unnecessary access to restricted APIs, resulting in security risks because hackers would be able to obtain access to restricted APIs by fraudulently obtaining a user's permission.

As a result, developers of applications are often reluctant to provide access to sensitive or restricted APIs (e.g., APIs that allow access to sensitive data such as a user's financial account and transactions, user privacy, etc.). However, without efficient and yet secure mechanisms for intra-application and/or application-system platform interactions, it is difficult to promote cooperation and communication between applications, thus preventing a healthy application eco-system flourishing with innovative and legitimate services from forming.

BRIEF DESCRIPTION OF THE DRAWINGS

Various embodiments of the invention are disclosed in the following detailed description and the accompanying drawings.

FIG. 2 is a flow chart illustrating an example process for obtaining permissions to access restricted APIs during the installation of an application, in accordance with one or more embodiments of the present disclosure.

FIG. 3A is a flow chart illustrating an example process for requesting access to restricted APIs, in accordance with one or more embodiments of the present disclosure.

FIG. 4 is a flow chart illustrating an example process for authorizing access to restricted APIs, in accordance with one or more embodiments of the present disclosure.

FIG. 5 is a flow chart illustrating an example process for obtaining permissions to access restricted APIs, in accordance with one or more embodiments of the present disclosure.

DETAILED DESCRIPTION

Figure 1:
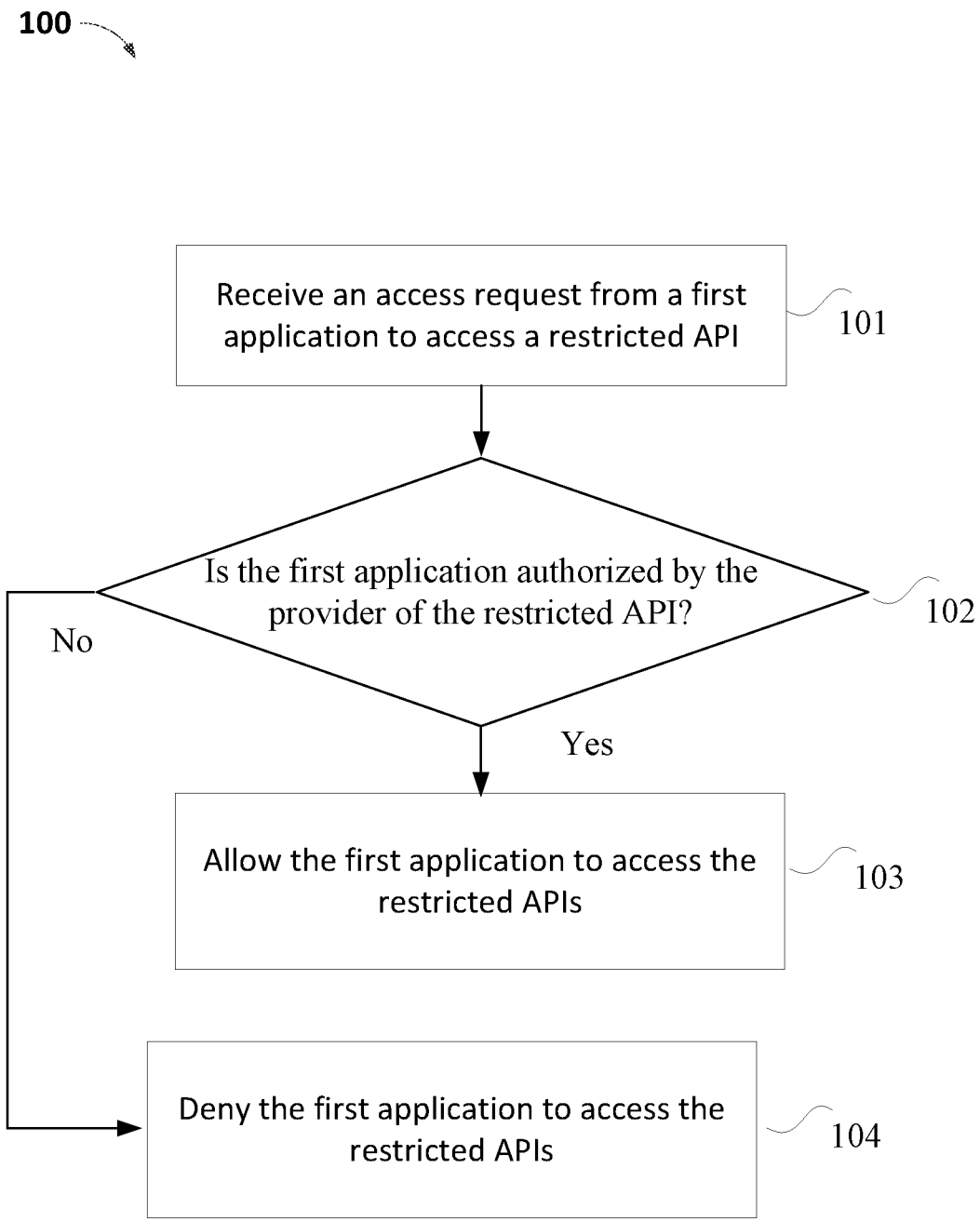
FIG. 1 is a flow chart illustrating an example process of accessing restricted APIs, in accordance with one or more embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for controlled access to restricted APIs are described herein. Upon receiving a request from a first application to access a restricted API associated with an application or with a system platform, it is determined whether the first application has been authorized with a permission by a provider of the restricted API to access the restricted APIs. If so, the first application obtains access to the restricted API. Otherwise, the first application is denied of the access to the restricted API. Thus, the developer of the application or the system platform supplying the restricted APIs is in control of managing and dictating which application is to be allowed access to the restricted APIs. As used herein, the term of "provider" and the "releasing party" refer to an entity or a group of entities who develops the application and/or systems that supply a restricted API which can be called by other applications or systems. Such entity can be a third party application or service developer, an operating system developer, a framework level system developer, and the like. For example, such entity can also be an individual developer, a community of developers, a manufacturer company, a telecommunication operator company, a software enterprise, a standard consortium, or the like. In some embodiments, a provider can delegate the authority to grant access to restricted APIs to other entities such as a centralized authorization entity (e.g., an authorization server, etc.).

As a result, the original usage intended by the developer of the application/system platform can be heeded, and the security risk associated with the misuse of permissions to access restricted APIs is eliminated. Further, with access to restricted APIs being provided in a controlled manner, more innovative applications and intra-application interactions can be designed and implemented towards an application eco-system flourishing with diverse and legitimate services. In particular, with the system provider being able to participate in the process of granting permissions to access its restricted APIs to applications, it is more convenient for the system provider to perform its operation and maintenance of the overall system on which a variety of applications are executing.

As used herein, restricted or protected APIs refer to the interfaces that are accessed only with a permission. In other words, restricted or protected APIs cannot be accessed by a requesting application without a particular permission. Typically, access to restricted APIs implements access to sensitive data (e.g., user financial account information, user privacy data, geo-location information, etc.) and/or system level resources (e.g., access to network, camera, phonebook contacts, etc.). Restricted APIs can be the APIs provided by an application (e.g., mobile pay App, Social Media App, Home Automation App, etc.), or a system platform (e.g., Android™ system, iOS™, Windows™, in-vehicle infotainment system, IoT operating systems, etc.). A restricted API provider can be a person, a company, a service provider, or a platform provider, who is capable of furnishing such restricted API for accessing by other applications on the same platform or on different platforms.

With controlled permission to access, the restricted APIs of a system platform or an application are protected in a uniformed manner, resulting in easier and streamlined implementation by both program developers and system administration staff who are in charge of the overall system operation and maintenance.

Before an application is released to the public, if the application needs access to restricted APIs of the other applications that are also released by the same provider (e.g., the restricted APIs are provided by the same provider), the provider can generate a credential of authorization which is recorded with the application (e.g., an Android Package Kit (APK) file, a JAR file, etc.).

If the restricted APIs are not provided by the provider itself, the application provider can transmit to the provider of the restricted APIs an authorization request. In turn, the provider of the restricted APIs determines whether or what type of permissions are to be granted to the requesting application. In determining to grant the requested access, the provider of the restricted APIs generates credentials of authorization corresponding to the request, and subsequently transmits the generated credentials of authorization to the requesting application provider. In implementations, credentials of authorization can include information such as the identity of the authorizing party, an identifier of the requesting application, and the like. Upon receiving the credentials of authorization from the provider of the restricted APIs, the provider of the requesting application in turn records the received credentials of authorization with the requesting application. For example, one way to include the credentials of authorization with a particular application for release is to store the credentials as part of the installation package of the application (e.g., an APK file). For purposes of simplicity, only one API provider is described with reference to the requesting of access to the restricted APIs. It should be understood that, as the requesting application can request access to various restricted APIs provided by various providing parties, the provider of the requesting application can similarly transmit authorization requests to various providing parties corresponding to the various restricted APIs.

In implementations, the application provider can transmit the authorization request to and receive the credentials of authorization from an authorization server using a device that is in communication with a network to which the authorization server is coupled. The authorization server can be software, firmware, hardware, or a combination thereof. In some embodiments, the authorization server is a centralized entity responsible for authorizing access between applications/systems on behalf of a plurality of applications/systems. In some other embodiments, the authorization server is distributed through a plurality of physical or virtual machines.

After being released and uploaded to an application server, the application can be downloaded by a user for installation onto a personal computer or a mobile electronic device. After installation, when the application initiates access to a particular restricted API during execution, the API-providing application, or system platform (e.g., operating systems such as iOS, Android, etc.), or a module designated to manage access of the APIs, is configured to verify whether the application has been properly authorized to access the restricted API, based on the credentials of authorization associated with the application. Such verification can be performed by, for example, pre-configured verification algorithms or by a verification process (e.g., interactive verification process) conducted at a verification server. If it is determined that the installed application is authorized with a permission to access the restricted API, the application is granted to access the restricted APIs. Otherwise, the application is denied accessing the restricted APIs.

In some embodiments, in order to address the security concerns that the afore-described credentials of authorization can be falsified, credentials of authorization are generated by use of the techniques of digital signature so that the authenticity of the authorization can be guaranteed. In particular, the provider of the restricted APIs can be configured to digitally sign the credentials of authorizations to perform the process of authorization. This way, a list of signatures associated with the requesting application can be generated as the result of different API providers generating respective signatures indicating the authorization of access to the restricted APIs. Therefore, when the requesting application executes an operation to access a restricted API during runtime, permission of such access can be verified based on whether the list of signatures associated with the requesting application includes a signature from the provider of the restricted API.

In implementations, from the perspective of security concerns, the uniqueness of an application should be ensured so that the source of an application can be ascertained as the legitimate source, not the one that is tampered with. Generally, the releasing party (e.g., the provider) of an application signs the application to generate a releasing party signature. For example, the Android™ system already requires applications that execute thereon be signed by the developer of the application (e.g., using the JAR signing scheme, and/or the APK signature scheme, etc.). Similarly, according to various embodiments of the present disclosure, based on the conventional signing mechanism available to developers, a multi-party signing mechanism can be provided to control access of restricted APIs. In some embodiments, prior to an application being released, the releasing party of the application signs the application first to generate a releasing party signature. In other words, in some examples, by signing the application, the releasing party is authorizing the application with permissions to access restricted APIs of other applications released by the same releasing party. Subsequently, for the restricted APIs supplied by other providers, the releasing party requests the providers of these restricted APIs to sign the application. As described in more detail below, the requesting can be performed by transmitting an authorization request to an authorization server that is in charge of granting permissions associated with the restricted APIs supplied by these other providers. The authorization server can be a centralized authority managing requested access to restricted APIs associated with a plurality of applications/systems, an authority designated to manage requested access to restricted APIs associated with a particular application/system or a particular group of applications/systems (e.g., mobile payment related applications, single-login service to all accounts of a user, etc.). The authorization server in turn generates a provider signature (e.g., authorization signature), if the application is determined as legitimate for accessing the restricted APIs. In other words, an application can be associated with not only the signature of its releasing party (e.g., the developer of the application, the provider of the application, and the like), but also with one or more authorization signatures corresponding to the one or more providers of the restricted APIs which the application needs to access. As such, not only can the authenticity of credentials of authorization be conveniently verified, it is also easier and more flexible to request access to a plurality of restricted APIs with an extendable chain of authorizing signatures.

With the authorization process completed, during the execution of an application, for each operation that requires the access of a specific restricted API, it is determined whether the permission to access has been granted to the application by the provider of the restricted API. If so, the application is allowed to access the restricted API that is not owned by it, the details of which are described in the following.

FIG. 1 illustrates a flow chart of an example process for accessing restricted APIs in accordance with an embodiment of the present disclosure. In this example, process 100 is implemented at a device on which an application that needs access to restricted APIs is executing. For example, process 100 can be implemented by, for example, system 600 of FIG. 6.

Process 100 starts at 101, where an access request is received from a first application for accessing a restricted API.

As used herein, a restricted API refers to a feature, functionality, or service that is provided either by an application, an operating system, or a framework level system. For example, a restricted API can be invoked by a calling to access user's location information, user's account data, user's financial transaction data, messaging data, ability to power on/off the device, etc. Taking Android™ for example, restricted APIs to camera functions are implemented in the package of "Android.hardware.camera2," restricted APIs to GPS functions are implemented in the package of "Android.gms.location," restricted APIs to Bluetooth functions are implemented in the package of "Android.things.bluetooth," etc. Taking the access to the camera functions in an Android system for example, the first application specifies its need to access the camera on the device in its Manifest file in the form of "<uses-permission android:name="android.permission.CAMERA"/>," and makes a call to "Camera.open( )" to access the camera function.

After being installed on the device, the first application is launched into execution triggered by inputs such as a command from a user, or a configuration command from the system on which the first application is executing. During the execution, when the first application needs to execute a call to a restricted API, typically an access request is generated and transmitted to the application supporting the restricted API, or the system platform supporting the restricted API, or a module designated to manage accesses to various interfaces. In some embodiments, the access request includes identifying information pertaining to the first application, and/or descriptive information (e.g. identifier) pertaining to the restricted API to be accessed.

At 102, it is determined whether the first application is authorized by the provider of the restricted API with permission to access. If so, process 100 continues to 103. Otherwise, process 100 continues to 104.

In this example, based on the credentials of authorization associated with the first application, it is determined whether the provider of the restricted API has granted the first application permission to access the restricted API. In some embodiments, the credentials of authorization can be accessed from the application package associated with the first application. For example, the credentials of authorization can be retrieved from the application package (e.g., APK file) stored in the memory of the device. In some embodiments, the credentials of authorization can be accessed from a server over a network to which the device is communicatively coupled. For example, the credentials of authorization generally include the identity information of these parties which have authorized the first application with permission to access their respective restricted APIs. On the other hand, the system usually records the identify information pertaining to those providers of the restricted APIs during the process of registration and/or installation. Therefore, when an entry of identity information pertaining to the provider of the restricted API is found in the credentials of authorization associated with the first application, it is determined that the provider of the restricted API has already granted the first application permission to access. Thus, process 100 continues to 103 to allow the first application to access the restricted API. Otherwise, process 100 continues to 104 to deny the first application access to the restricted API.

In some embodiments, the credentials of authorization can be encrypted. In this case, the credentials are first decrypted with corresponding decryption algorithms (e.g., RSA decryption), and then it is determined whether the identity information pertaining to the provider of the restricted API is part of the decrypted credentials of authorization. In some embodiments, step 102 can be performed in collaboration with an identity verification server.

In some embodiments, as described above, in order to address the security concern that a credential of authorization can be falsified by fraudsters, credentials of authorization are generated by use of the techniques of digital signature so that the authenticity of the authorization can be guaranteed. In particular, the provider of the restricted APIs can be configured to digitally sign the credentials of authorizations to perform the process of authorization. Accordingly, based on whether the list of signatures includes the signature from the provider of the restricted APIs, it is determined whether the first application is authorized by the provider of the restricted API with permission to access. In some embodiments, the list of signatures is stored as part of the application package (APK file) for the first application. In some embodiments, the list of signatures is stored at a server over a network to which the device is communicatively coupled.

Taking the example where a first application needs to access the restricted APIs of a second application, step 102 can be performed based on the public key certificate associated with the second application. The public key certificate is stored at, for example, the memory of the device, during the installation process of the second application, and retrieved from the memory by the system after the installation. Next, for each of the signatures in the list of authorization signatures associated with the first application, it is determined whether a public key certificate included in an authorization signature in the list is identical to the retrieved public key certificate associated with the second application. For example, the two certificates can be compared in a bit-wise manner to verify whether the bits of two certificates match. If so, then the authorization signature associated with the first application is the signature generated by the second application. As such, the first application is authorized by the second application with permission to access the restricted APIs.

FIG. 2 illustrates a flow chart of an example process of obtaining permission to access restricted APIs in accordance with an embodiment of the present disclosure. Process 200 can be implemented partially at, for example, step 102 of process 100.

In this example, in order to simplify the authorization process, increase the overall execution efficiency, and facilitate the management of controlled access authorization, an access to a restricted API is associated with a private permission or a requested permission. Taking Android for example, a requested private permission to access external storage can be specified in a corresponding Manifest file in the form of "<uses-permission android:name="android.permission.WRITE EXTERNAL STORAGE" As such, step 102 can be performed by two sub-steps. First, the private permissions associated with the first application are obtained during the installation thereof. Second, based on the obtained private permissions, it is determined whether the first application has been granted access to the restricted APIs. In general, an application or a system can declare access to its restricted APIs as private permission based in a configuration file. For example, an indicator of "private" can be specified in the settings of permission declaration. As to the first application, it can request private permissions in a configuration file in order to access restricted APIs, and execute the operation to obtain the private permissions during its installation. More details are described in the following with reference to process 200.

Process 200 starts at 201, where all the public key certificates are retrieved from the list of authorization signatures associated with the first application. The retrieved public key certificates are in turn stored in a collection of signatures.

In some embodiments, for each signature of the list of authorization signatures, the signature is first verified using digital signature verification mechanisms, e.g., with the public key corresponding to the respective signature. For example, the public key can be used to decrypt the digest included in the public key certificate. Upon successful verification of the digital signature, the public key certification included in the authorization signature is extracted and recorded in a collection of signatures.

Here, even though the verification mainly serves the purpose of verifying the authenticity of the signatures, it can also verify the integrity of the signatures at the same time. For example, when the above-described most recently generated signature is designated as the document to be signed in the access request, and the provider of the restricted API signs and returns an authorization signature, step 201 also performs the verification of the validity of the signatures.

For example, the first application provider signs and generates a signature of signature 1.xml, the second application provider signs and generates a signature of signature 2.xml based on the received signature 1.xml, and a third application provider signs and generates a signature of signature 3.xml based on the received signature 2.xml. Here, the verification of signatures of the list of authorization signatures is described in the following.

First, the digital signature included in signature 3.xml is decrypted with the public key associated with the public key certificate included in signature 3.xml. When the decrypted digest is determined as the same as the digest of signature 3.xml, it is verified that the authorization signature is indeed generated and signed by the party identified in the public key certificate of signature 3.xml. Next, the digest of signature 2.xml is computed, the result of which is compared with the decrypted digest of signature 2.xml to determine whether the two digests are identical. If so, the validity of signature 2.xml is verified accordingly.

Second, the digital signature included in signature 2.xml is decrypted with the public key associated with the public key certificate included in signature 2.xml. When the decrypted digest is determined as the same as the digest of signature 2.xml, it is verified that the authorization signature is indeed generated and signed by the party identified in the public key certificate of signature 2.xml. Next, the digest of signature 1.xml is computed, the result of which is compared with the decrypted digest of signature 1.xml to determine whether the two digests are identical. If so, the validity of signature 1.xml is verified accordingly.

Third, the digital signature included in signature 1.xml is decrypted with the public key associated with the public key certificate included in signature 1.xml. When the decrypted digest is determined as the same as the digest of signature 1.xml, it is verified that the authorization signature is indeed generated and signed by the party identified in the public key certificate of signature 1.xml. Next, the digest of the first application is computed, the result of which is compared with the decrypted digest of signature 1.xml to determine whether the two digests are identical. If so, the validity of the first application is verified accordingly.

At 202, the configuration file of the first application is analyzed to retrieve private permissions that are associated with the access of the restricted APIs of another application, and/or a system platform.

In this example, the first application declares in its configuration file private permissions associated with accessing the restricted APIs if such access is needed. Therefore, the configuration file can be parsed and analyzed to retrieve information related to the settings of private permissions configured for the first application.

At 203, for each private permission configured, a public key certificate corresponding to the restricted API is retrieved from a pre-configured declaration of the private permission. The declaration is described with more details below. Then, it is determined whether the retrieved public key certificate matches a copy of the public key certificate recorded in the afore-described collection of signatures. If so, it is determined that the first application has been authorized with private permission required for its execution.

In some embodiments, the designation of private permissions can be specified by an application, or by a system platform. The above-described declaration of private permissions includes a mapping relationship between each of the private permission and the corresponding public key certificate associated with the respective declaring party.

In some embodiments, the declaration of private permissions is generated by an installation program (e.g., an installer) during the course of the installation of the system platform or an application. For example, the configuration file of the system platform or the application is parsed and analyzed to obtain the declared private permissions that are associated with accessing its restricted APIs. Then, the public key certificates are retrieved from the signatures of the providers of the system platform or the application to be installed. Next, a mapping relationship between the restricted APIs and respective public key certificates is established and recorded in the declaration of private permissions.

In some embodiments, for each private permission specified in the obtained private permission information, a corresponding public key certificate is obtained from the pre-configured declaration of private permissions based on the private permission under processing. Then, it is determined whether the obtained public key certificate matches with a copy of a public key certificate included in the collection of signatures associated with the first application. If so, it is determined that the first application has been authorized with the corresponding private permission, e.g., allowed to access the restricted API associated with the private permission. When each private permission specified in the private permission information is processed as above-described, the obtaining of the private permissions by the first application is concluded.

Upon the execution of steps 201 through 203 during the installation of the first application, all the private permissions associated with the first application are determined. Therefore, when at step 101 where a restricted API is to be accessed during the execution of the first application, it is determined, based on the results from the above-described obtaining of private permissions during the installation of the first application, whether the first application has obtained the private permission associated with the restricted API. If so, it is determined that the first application has been authorized to access the restricted API by the provider thereof. Otherwise, it is determined that the first application has not been authorized to access the restricted API by the provider thereof.

Referring back to FIG. 1, at 103, the first application is allowed to access the restricted API. At this step, since it is determined that the first application has been authorized to access the restricted API by the provider thereof, the first application is duly allowed such restricted access. For example, with access to restricted APIs, the first application can be configured to invoke a function supported at the restricted API, perform operations supported at the restricted API, or the like.

According to various embodiments of the present disclosure, the original usage intended by the developer of the application/system platform can be followed, and the security risk associated with the misuse of permissions to access restricted APIs is reduced. Further, with access to restricted APIs being provided in a controlled manner, more innovative applications and intra-application interactions can be designed and implemented towards an application ecosystem flourishing with diverse and legitimate services. In particular, with the system provider being able to participate in the process of granting permissions to access its restricted APIs to applications, it is more convenient for the system provider to perform its operation and maintenance of the overall system on which a variety of applications are executing.

FIG. 3A illustrates a flow chart of an example process for requesting access to restricted APIs in accordance with an embodiment of the present disclosure. Process 300 can be implemented by, for example, system 600 of FIG. 6.

Process 300 starts at 301, where an authorization request is transmitted by a requesting application to the provider of a restricted API to request access to the restricted API.

In some embodiments, the request includes a document associated with the requesting application, and the document is to be signed. Such document can include, for example, a most recently generated authorization signature that is also included in the list of authorization signatures associated with the requesting application.

At 302, the credentials of authorization returned by the provider of the restricted API are received.

In some embodiments, the credentials of authorization include an authorization signature, which is generated by the provider of the restricted API by signing the above-described document with its private key.

At 303, the received credentials of authorization are recorded as part of the application. In some embodiments, the credentials of authorization are stored in the list of authorization signatures associated with the requesting application. In some embodiments, the credentials of authorization are embedded in the APK of the application.

As illustrated in the afore-described steps, for a requesting application that needs access to a restricted API, an access request can be communicated to the provider of the restricted API beforehand. Consequently, if granted, a credential of authorization is obtained also beforehand. Thus, during the execution of the application, it can be determined that the application has been authorized with access to the restricted API based on the credential of authorization. As a result, the application can continue the operation to access the restricted API during its execution.

Figure 3B:
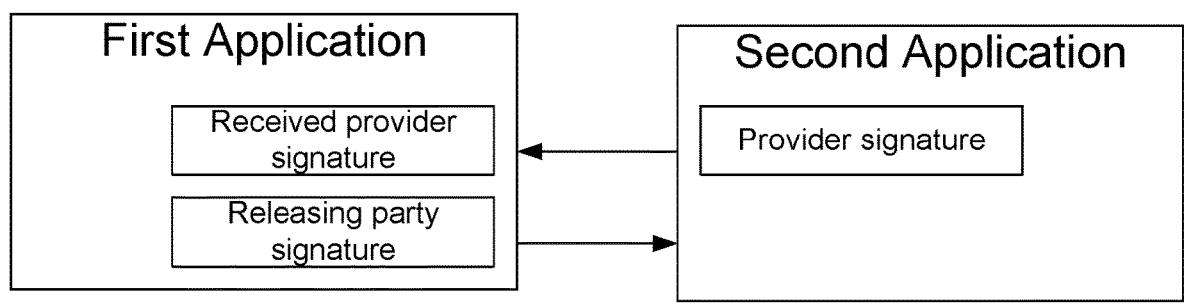
FIG. 3B is a schematic diagram illustrating an example process for requesting access to restricted APIs, in accordance with one or more embodiments of the present disclosure.

FIG. 3B illustrates a schematic diagram of an example process for requesting access to restricted APIs in accordance with an embodiment of the present disclosure. Here, an example multi-party permission authorizing process that is based on the afore-described releasing party of an application signing in a conventional manner is described. As shown herein, Application A is the application that needs permission to access the restricted APIs of Application B, in order to realize its functionalities. Application A and Application B are provided by different providers.

In the beginning, the releasing party of Application A (e.g., signer) signs Application A with its private key, and generates a releasing party signature. Any suitable techniques can be used by the releasing party to sign Application A, without limitation. For example, a digest of Application A can be generated using a pre-configured algorithm (e.g., MD5, SHA-0, or SHA-1 algorithm, etc.). Then, the digest is encrypted with the private key by, for example, applying the RSA algorithm to generate a digital signature. Lastly, the digest, the digital signature, and the public key certificate associated with Application A are stored into a signature (e.g., signature 1.xml file) to generate a releasing party signature. The signature is in turn recorded to a list of signatures associated with Application A. Here, the public key certificate typically includes information such as the public key of the releasing party, the identity information of the releasing party, the encryption algorithm applied by the releasing party for generating the digital signature, etc.

Next, the releasing party of Application A transmits an authorization request from a first client to the provider of a restricted API. The transmission can be implemented with any suitable techniques such as web based protocol, and the like. In some embodiments, the authorization request is transmitted to an above-described authorization server which is capable of authorizing accesses to restricted APIs on behalf of the provider of the restricted API. In some embodiments, the authorization server functions as a conduit to relay the authorization request to the provider of the restricted API for processing. The authorization request includes a document associated with Application A, the document is to be signed. More details of the document are described below.

Upon receiving the authorization request at a second client, the provider of Application B (e.g., signer) signs the document included in the authorization request with its private key to generate an authorization signature. Similarly, any suitable techniques can be applied herein to the signing of the document by the provider of Application B, without limitation. For example, a digest of the document to be signed can be generated using a pre-configured algorithm (e.g., MD5, SHA-0, or SHA-1 algorithm, etc.). Then, the digest is encrypted (e.g., using RSA, etc.) with the private key of the provider of Application B to generate a digital signature. Lastly, the digest, the digital signature, and the public key certificate of the provider of Application B are stored into a signature (e.g., signature 2.xml file) to generate an authorization signature. The authorization signature is returned to the requesting first client. Here, the public key certificate of the provider of Application B typically includes information such as the public key of the provider of Application B, the identify information of the provider of Application B, the encryption algorithm applied by the provider of Application B for generating the digital signature, etc.

Lastly, upon receiving the authorization signature returned from the second client, the releasing party records the authorization signature into a list of signatures associated with Application A, thereby concluding the authorization of permissions for Application A to access the restricted APIs of Application B.

In some embodiments, the document included in the authorization request that is to be signed includes a document associated with Application A. For example, the document can include all the files of the installation package of Application A without the list of signatures.

In some embodiments, in order to decrease the usage of network bandwidth and to provide a mechanism for verifying the validity of the signatures, the document to be signed can include the signature that is on the list of the signatures associated with Application A, and is most recently generated. For example, Application A needs to access the restricted APIs associated with both Application B and Application C. As described above, first, the releasing party of Application A signs Application A and generates the releasing party signature (e.g., signature 1.xml), which is recorded into the list of signatures associated with Application A. At this point in time, signature 1.xml is the most recently generated signature associated with Application A. Next, the signature 1.xml file is transmitted as the document to be signed to the provider of Application B, which in turn signs the signature 1.xml file to generate an authorization signature (e.g., signature 2.xml), which is returned to the releasing party of Application A. At this point in time, the list of signature of Application A includes both signature 1.xml and signature 2.xml, the latter being the most recently generated signature. Subsequently, the releasing party of Application A transmits the file signature 2.xml as the document to be signed to the provider of Application C. Once the provider of Application C signs signature2.xml and returns a corresponding authorization signature (e.g., signature 3.xml), the releasing party of Application A records signature 3.xml into the list of signatures. At this point in time, the list of signatures associated with Application A includes three signatures, which authorize Application A not only to access the restricted APIs in other applications published by Application A's publisher, but also the authorization of the publishers of application B and application C.

Additionally, by use of the above-described embodiments, the validity of signatures associated with Application A can also be verified. For example, when it comes to verifying the signatures during the installation process of Application A, signature 3.xml can be used to validate signature 2.xml, signature 2.xml can be used to validate signature 1.xml.

The above-described examples illustrate a process of authorizing permissions to access restricted APIs amongst different applications. It should be understood that a system platform, on which Application A executes, can also be provisioned to provide its restricted APIs to applications. In this case, Application A requests access to such restricted APIs according to its requirements. Here, the provider of restricted APIs is the developer or the releasing party of the system platform. Accordingly, the releasing party of Application A sends an authorization request to the provider of the system platform, which signs the document to be signed with its private key (e.g., the system key) to generate an authorization signature. Similarly, the releasing party of Application A can send the authorization request to the provider of the system platform via any suitable transmission techniques such as web-based protocol, and the like. Subsequently, the authorization signature is returned to the releasing party of Application A, which in turn records the returned signature to the list of signatures associated therewith.

According to various embodiments of the present disclosure, the provider of a system platform is enabled to actively participate in the process of permission authorization associated with applications. For example, for an application to be executed on a system platform, the provider of the system platform can obtain and analyze the developed application to determine whether authorized permissions are to be granted to allow the application to access the restricted APIs, based on the functionalities implemented in the application. If so, the provider of the system platform generates corresponding credentials of authorization (e.g., authorization signature generated with the system key), and stores the authorization signature to the application. Then, the application package is uploaded to an application server for release. With the provider of a system platform being able to manage the permission authorization of restricted APIs to be accessed by applications executing thereon, the interactions between various applications and the system can be promoted, leading to more applications accessing special services of the system. Further, with such afore-mentioned ability, the provider of the system platform is equipped with comprehensive knowledge of which application has been granted with access to which restricted APIs of the system, which can be modified and adjusted based on the overall needs in terms of the system operation and maintenance, resulting in more convenience and efficiency of the overall system operation and maintenance.

FIG. 4 illustrates a flow chart of an example process for authorizing access to restricted APIs in accordance with an embodiment of the present disclosure. Again, as most aspects of process 400 are substantially similar to those above-described with reference to FIGS. 1-2, for simplicity of illustrations, details of these functionalities are not repeated herein. Process 400 can be implemented by, for example, system 600 of FIG. 6.

Process 400 starts at 401, where an application to be authorized with permissions to access the restricted APIs is determined.

In some embodiments, such an application can be determined based on the received authorization request for accessing the restricted API. For example, such authorization request can include identifying information related to the requesting application, such as the application title, or other identifier associated with the requesting application. As described above, the authorization request also includes a document to be signed by the provider of the restricted API.

In order to facilitate the operation and maintenance of a system platform, and to enable the system platform provider to actively participate in the authorization process for applications that execute on the system platform, an application that is to be released can be determined as the application to be authorized with permission to access restricted APIs. In this case, the document to be signed is a document associated with the selected application. In some embodiments, a most recently generated signature that is included in the list of signatures associated with the selected application is designated as the document to be signed.

At 402, a credential of authorization is generated to indicate that the provider of the restricted APIs allows the requested access to the restricted APIs by the determined application.

Here, by use of the techniques of digital signature, the document associated with the requesting application is signed with the private key of the provider of the restricted APIs to generate an authorization signature. In this case, the generated authorization signature is the credential of authorization.

When an authorization request is received at step 401, after step 402 is concluded, the generated authorization signature can be returned to the sending party of the authorization request. When a system provider determines an application as the application to be authorized with permissions to access the restricted APIs, after step 402 is concluded, the generated credential of authorization e.g., an authorization signature, can be stored to the list of signatures associated with the application.

As described herein at steps 401-402, with embodiments of the present disclosure, a provider of restricted APIs can generate credentials of authorization for the requesting applications beforehand. As such, it is determined whether an application has been authorized by the provider of the restricted APIs to access restricted APIs, during the execution of the application.

FIG. 5 illustrates a flow chart of an example process for accessing restricted APIs in accordance with an embodiment of the present disclosure. Again, as most aspects of process 500 are substantially similar to those above-described with reference to FIGS. 1-2, for simplicity of illustrations, details of these functionalities are not repeated herein. Process 500 can be implemented by, for example, system 600 of FIG. 6.

Process 500 starts a 501, where the identification information associated with the authorizing parties is retrieved from the credential of authorization associated with an application. The retrieved identification information is stored in a collection of authorizing parties.

In some embodiments, the credential of authorization includes information indicating that the provider of the restricted APIs has authorized the application with permission to access the restricted APIs. A credential of authorization includes at least the identification information associated with the identity of the authorizing party (e.g., the provider of the restricted APIs). Such identification information can include a unique identifier associated with the authorizing party. The credential of authorization can also include the identification information associated with the application. Here the identification information related to each authorizing party is retrieved and stored to the collection of authorizing parties.

In some embodiments, the credentials of authorization include a list of signatures associated with the application. In this case, the identification information associated with the authorizing party is the public key certificate associated with the signature. Again, the list of signatures includes the signature of the provider of the application, or the signature of the provider of the application together with the signatures from the providers of the restricted APIs, the provider of the application being a provider other than the providers of the restricted APIs.

At 502, a configuration file associated with the application is parsed and analyzed to retrieve private permissions associated with the requests for access to the restricted APIs.

At 503, for each of the retrieved private permissions, the identification information associated with the private permission is retrieved from a pre-configured declaration of private permissions. Next, it is determined whether a copy of the identification information from the collection of authorizing parties matches the retrieved identification information. If so, it is determined that the application has obtained the private permission.

In some embodiments, the declaration of private permissions is generated by the installation process of the system, or other applications that provide the restricted APIs. The declaration further records a mapping relationship between the private permissions declared by the installed system/applications and the identification information of the declaring parties.

As illustrated herein through steps 501-503, according to various embodiments of the present disclosure, the private permissions associated with the application can be determined based on the credentials of authorization associated with the application, and the private permissions associated with requesting access to restricted APIs. As such, it is determined whether the application is authorized by the provider of the restricted APIs. In particular, since process 500 is performed during the installation of the application, the determination of whether the application is authorized to access the restricted APIs at runtime can be reduced such that execution efficiency can be improved.

The units described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The units may be implemented on a single device or distributed across multiple devices. The functions of the units may be merged into one another or further split into multiple sub-sub-units.

Figure 6:
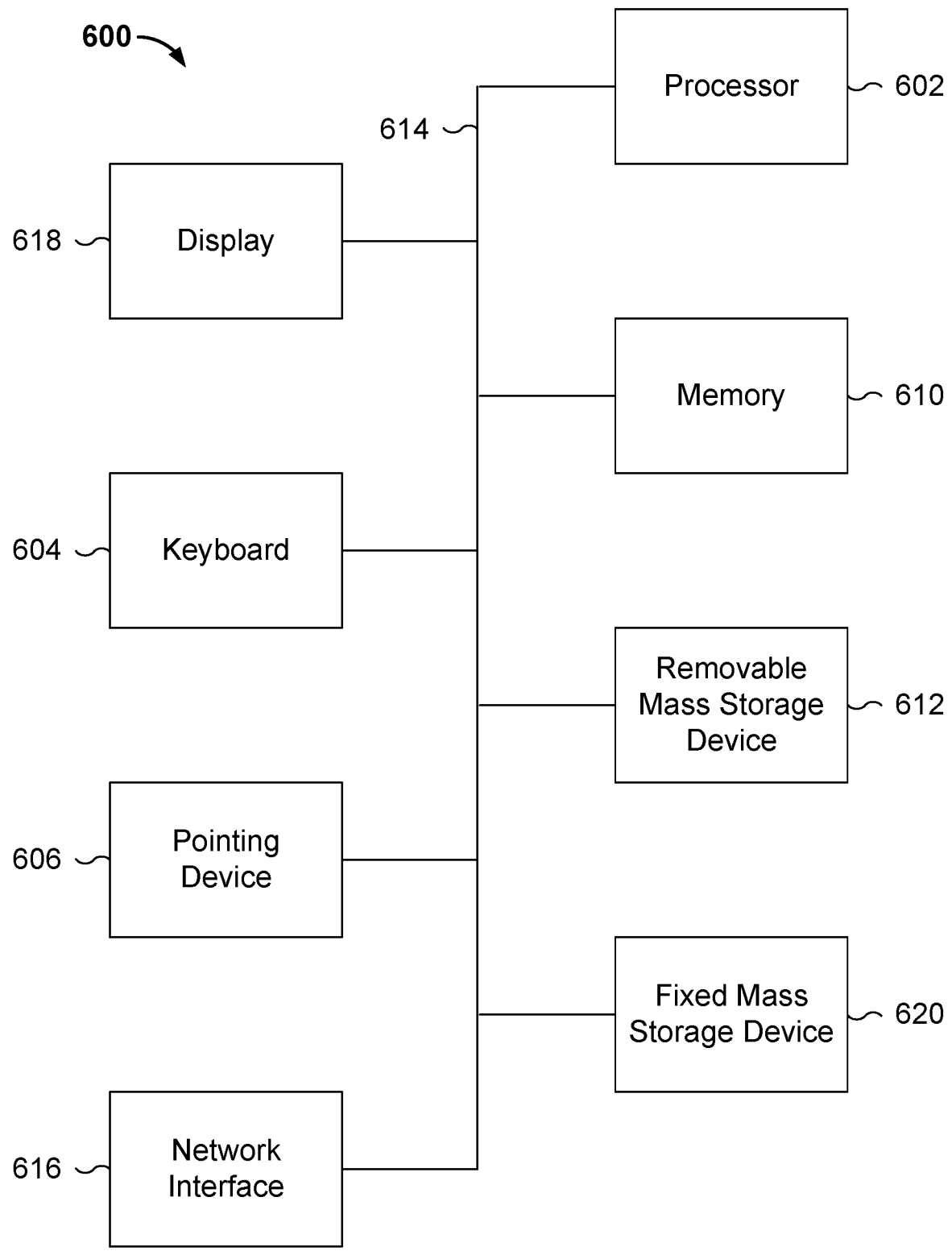
FIG. 6 is a functional diagram illustrating an embodiment of a programmed computer system for accessing restricted APIs, in accordance with one or more embodiments of the present disclosure.

FIG. 6 is a functional diagram illustrating an embodiment of a programmed computer system for configuring attributes associated with interface elements. As will be apparent, other computer system architectures and configurations can be used to configure attributes associated with interface elements. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618). In some embodiments, processor 602 includes and/or is used to provide the launch of a client application based on a message.

Processor 602 is coupled bi-directionally with memory 610, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storages can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600 and is coupled either bi-directionally (read/write) or uni-directionally (read only) to processor 602. For example, storage 612 can also include computer readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Mass storage 612, 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers. Persons skilled in the art may clearly understand that, for the sake of descriptive convenience and streamlining, one may refer to the processes in the aforesaid method embodiments that correspond to specific work processes of the systems, devices, and units described above. They will not be discussed further here.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media, (transitory media), such as modulated data signals and carrier waves.

A person skilled in the art should understand that embodiments of the present application can be provided as methods, systems, or computer program products. Therefore, the present application can take the form of an entirely hardware embodiment, an entirely software embodiment, or an embodiment that combines software and hardware aspects. In addition, the present application can take the form of computer program products implemented on one or more computer-operable storage media (including but not limited to magnetic disk storage devices, CD-ROMs, and optical storage devices) containing computer operable program codes.

The present application is described with reference to flowcharts and/or block diagrams based on methods, devices (systems), and computer program products of embodiments of the present application. Please note that each process and/or block within the flowcharts and/or block diagrams and combinations of processes and/or blocks within the flowcharts and/or block diagrams can be realized by computer commands. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command devices. These command devices implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

Although preferred embodiments of the present application have already been described, persons skilled in the art can make other alterations and modifications to these embodiments once they grasp the basic creative concept. Therefore, the attached claims are to be interpreted as including the preferred embodiments as well as all alterations and modifications falling within the scope of the present application.

Obviously, a person skilled in the art can modify and vary the present application without departing from the spirit and scope of the present application. Thus, if these modifications to and variations of embodiments of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for accessing a restricted application programming interface (API), comprising:
 receiving, from a first application, a request to access the restricted API, wherein the restricted API is not supported by the first application;
 determining whether the first application is authorized by a provider of the restricted API to access the restricted API, including by:
  obtaining identification information associated with at least one authorizing party from a credential of authorization associated with the first application;

determining a private permission associated with the restricted API that is requested by the first application from a configuration file associated with the first application;

retrieving, from a pre-configured declaration, identification information corresponding to the private permission associated with the restricted API; and determining whether at least a portion of the obtained identification information associated with the at least one authorizing party matches the retrieved identification information associated with the private permission associated with the restricted API; and granting, in response to the determination that the first application is authorized by the provider of the restricted API to access the restricted API, the first application access to the restricted API.

2. The method of claim 1, wherein the provider of the restricted API includes one of the following: a provider of a system that supports the restricted API, or a provider of a second application that supports the restricted API.

3. The method of claim 1, wherein the credential of authorization includes a signature, the signature being included in a signature list associated with the first application.

4. The method of claim 3, wherein the signature of the signature list associated with the first application includes: a digest, a digital signature generated by encrypting the digest with a private key of a signer of the signature, and a public key certificate of the signer.

5. The method of claim 3, wherein the signature list comprises: a signature of a provider of the first application, and/or a signature of the provider of the restricted API, the provider of the restricted API being a provider other than the provider of the first application.

6. The method of claim 5, wherein the signature of the provider of the restricted API is generated by:

transmitting, by a first client, an authorization request to the provider of the restricted API;

generating, by a second client, the signature of the provider of the restricted API by digitally signing a document with a private key of the provider of the restricted API, wherein the document is included in the authorization request to be signed;

returning, by the second client, the generated signature to the first client; and recording, by the first client, the returned signature to the signature list associated with the first application.

7. The method of claim 6, wherein the document includes a signature of the signature list associated with the first application, and the signature is generated most recently.

8. The method of claim 4, wherein an installation process of the first application includes:

retrieving the public key certificate from the signature list associated with the first application;

storing the retrieved public key certificate to a collection of signatures;

analyzing the configuration file of the first application to retrieve a set of one or more private permissions associated with requesting for a respective restricted API of an application or a system; and determining whether the first application is authorized to access the restricted API based at least in part on the retrieved set of one or more private permissions.

9. The method of claim 8, further comprising:

extracting the obtained identification information comprising a public key certificate corresponding to the private permission from the pre-configured declaration, wherein the pre-configured declaration is associated with the set of one or more private permissions;

searching the collection of signatures to determine whether the identification information associated with the at least one authorizing party comprising the retrieved public key certificate in the collection of the signatures matches the extracted public key certificate corresponding to the private permission; and in response to the determination that the retrieved public key certificate in the collection of signatures matches the extracted public key certificate corresponding to the private permission, determining that the first application has obtained the private permission associated with the restricted API;

wherein the determining of whether the first application is authorized by the provider of the restricted API to access the restricted API comprises:

in response to the determination that the first application has obtained the private permission associated with the restricted API, determining that the first application is authorized by the provider of the restricted API to access the restricted API.

10. The method of claim 8, wherein the retrieving of the retrieved public key certificate from the signature list associated with the first application, and the storing of the retrieved public key certificate to the collection of signatures includes, for a signature of the collection of signatures:

verifying the signature based on a digital signing mechanism;

in response to the signature being verified as valid, retrieving from the verified signature the public key certificate; and storing the retrieved public key certificate to the collection of signatures.

11. A method for requesting access to a restricted application programming interface (API), comprising:

transmitting an authorization request to a provider of the restricted API, the request being configured to request the provider of the restricted API to authorize a requesting application access to the restricted API;

receiving authorization information returned by the provider of the restricted API; and storing the received authorization information to the requesting application, wherein the received authorization information is to be used to grant the requesting application access to a private permission associated with the restricted API, wherein the private permission associated with the restricted API is to be stored in a configuration file associated with the requesting application.

12. The method of claim 11, wherein:

the authorization request includes a document to be signed;

the authorization information comprises a signature generated by digitally signing the document included in the authorization request with a private key of the provider of the restricted API; and the storing of the authorization information to the requesting application comprises storing the received signature to a signature list associated with the requesting application.

13. The method of claim 12, wherein the document included in the authorization request includes a signature of the list of signatures associated with the requesting application, the signature being generated most recently.

14. A system for accessing a restricted application programming interface (API), comprising:
one or more processors configured to:
receive, from a first application, a request to access the restricted API, the restricted API not supported by the first application;
determine whether the first application is authorized by a provider of the restricted API to access the restricted API, including to:
obtain identification information associated with at least one authorizing party from a credential of authorization associated with the first application;
determine a private permission associated with the restricted API that is requested by the first application from a configuration file associated with the first application;
retrieve, from a pre-configured declaration, identification information corresponding to the private permission associated with the restricted API; and
determine whether at least a portion of the obtained identification information associated with the at least one authorizing party matches the retrieved identification information associated with the private permission associated with the restricted API; and
grant, in response to the determination that the first application is authorized by the provider of the restricted API to access the restricted API, the first application access to the restricted API; and
one or more memories coupled to the one or more processors, configured to provide the one or more processors with instructions.

15. The system of claim 14, wherein the provider of the restricted API includes one of the following: a provider of a system that supports the restricted API, or a provider of a second application that supports the restricted API.

16. The system of claim 14, wherein the credential of authorization includes a signature of the provider of the restricted API, the signature being included in a signature list associated with the first application.

17. The system of claim 16, wherein the signature of the signature list associated with the first application includes: a digest, a digital signature generated by encrypting the digest with a private key of a signer of the signature, and a public key certificate of the signer.

18. A computer program product, the computer program product being embodied in a tangible computer readable storage medium and comprising computer instructions for:
receiving, from a first application, a request to access the restricted API, the restricted API not supported by the first application;
determining whether the first application is authorized by a provider of the restricted API to access the restricted API, including by:
obtaining identification information associated with at least one authorizing party from a credential of authorization associated with the first application;
determining a private permission associated with the restricted API that is requested by the first application from a configuration file associated with the first application;
retrieving, from a pre-configured declaration, identification information corresponding to the private permission associated with the restricted API; and
determining whether at least a portion of the obtained identification information associated with the at least one authorizing party matches the retrieved identification information associated with the private permission associated with the restricted API; and
granting, in response to the determination that the first application is authorized by the provider of the restricted API to access the restricted API, the first application access to the restricted API.

19. The system of claim 16, wherein the signature list comprises: a signature of a provider of the first application, and/or a signature of the provider of the restricted API, the provider of the restricted API being a provider other than the provider of the first application.

20. The computer program product of claim 18, wherein the provider of the restricted API includes one of the following: a provider of a system that supports the restricted API, or a provider of a second application that supports the restricted API.

* * * * *

UNITED STATES PATENT AND TRADEMARK OFFICE
CERTIFICATE OF CORRECTION

| | |
|---|---|
| PATENT NO. | : 10,878,066 B2 |
| APPLICATION NO. | : 16/037809 |
| DATED | : December 29, 2020 |
| INVENTOR(S) | : Shaoxiang Qiu |

Page 1 of 1

It is certified that error appears in the above-identified patent and that said Letters Patent is hereby corrected as shown below:

In the Specification

In Column 8, Line(s) 25 & 26, delete "WRITE EXTERNAL STORAGE" and insert --WRITE_EXTERNAL_STORAGE--, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*